(12) United States Patent
Gutmann (10) Patent No.: US 6,623,139 B1
(45) Date of Patent: Sep. 23, 2003

(54) POCKET LAMP, ESPECIALLY A PART OF THE HOUSING

(76) Inventor: Max Gutmann, Buschrosenweg 16, 81377 Munchen (DE)

(*) Notice: Subject to any disclaimer, the term of this patent is extended or adjusted under 35 U.S.C. 154(b) by 0 days.

(21) Appl. No.: 09/831,470

(22) PCT Filed: Nov. 9, 1999

(86) PCT No.: PCT/EP99/08576
§ 371 (c)(1),
(2), (4) Date: Nov. 15, 2001

(87) PCT Pub. No.: WO00/28258
PCT Pub. Date: May 18, 2000

(30) Foreign Application Priority Data

Nov. 10, 1998 (DE) ..................... 298 20 081 U (51) Int. Cl.[7] .............................. F21L 4/02; F21V 33/00
(52) U.S. Cl. ..................... 362/184; 362/251; 362/205; 362/800
(58) Field of Search .................. 362/251, 228, 362/205, 206, 184, 394, 800; 200/60

(56) References Cited

U.S. PATENT DOCUMENTS

| 1,466,350 A | * | 8/1923 | Barany ................ 362/205 |
| 1,645,487 A | * | 10/1927 | Harling ................ 362/205 |
| 2,538,332 A | | 1/1951 | Schaefer ................ 240/10.6 |
| 5,595,435 A | * | 1/1997 | Palmer et al. ............ 362/109 |
| 5,617,304 A | | 4/1997 | Huang ................ 362/118 |
| 5,629,105 A | * | 5/1997 | Matthews ................ 362/184 |
| 5,871,272 A | * | 2/1999 | Sharrah et al. ............ 362/184 |

FOREIGN PATENT DOCUMENTS

| DE | G 84 38286.4 | 12/1984 | ............ F21L/7/00 |
| DE | G 89 15590.4 | 5/1989 | ............ F21L/7/00 |
| DE | G 94 15815.0 | 10/1994 | ............ F21L/75/02 |
| DE | 297 01556 U1 | 4/1997 | ............ F21L/9/00 |
| DE | 297 10039 U1 | 9/1997 | ............ F21L/1/00 |
| DE | 297 17158 U1 | 2/1998 | ............ F21L/11/00 |
| WO | WO 94/13022 | 6/1994 | ............ H01M/2/10 |

* cited by examiner

Primary Examiner—Sandra O'Shea
Assistant Examiner—Bao Truong
(74) Attorney, Agent, or Firm—Head, Johnson & Kachigian (57) ABSTRACT

The invention concerns a pocket light or a, housing portion for a pocket light, which has different lamps for different purposes of use and which in particular is very simple in terms of its technical structure. A housing portion according to the invention for closing the housing of a pocket light having a primary lamp, a secondary switch and a housing, wherein the housing portion has at least one secondary lamp and a secondary switch for switching the secondary lamp on and off, is distinguished in that the secondary lamp is a laser diode or is connected in the circuit of the primary lamp in series in relation thereto and the secondary switch in the closed condition short-circuits the secondary lamp.

27 Claims, 9 Drawing Sheets

POCKET LAMP, ESPECIALLY A PART OF THE HOUSING

CROSS-REFERENCE TO RELATED APPLICATION

This application claims priority to PCT Application No. PCT/EP99/08576 filed Nov. 9, 1999, which claims priority to German Utility Model Application No. 29820081.3 filed Nov. 10, 1998.

I. Field of Use

The invention concerns pocket lights and more specifically in particular those pocket lights in which the housing at least partially comprises electrically conductive material, in particular aluminum or titanium, so that this electrically conductive portion of the housing is a component part of the circuit of the light.

II. Technical Background

In this respect once again in particular those forms of pocket lights or flashlights which are generally referred to as rod-shaped or tubular pocket lights or flashlights, in which therefore the main body of the housing comprises a tubular portion into which the batteries which are also round in cross-section are inserted are of significance. The lamp is disposed at one end of the main body while the other end of the main body is sealingly closed by a closure cap. In that case, the individual parts are preferably connected together by way of screwthreads and an inserted sealing ring in order to prevent the ingress of moisture.

In principle however the present invention can also be applied to other forms of pocket lights or flashlights, for example pocket lights with a rectangular housing, in which the lamp is disposed on the front side while provided on the housing on the rear side is a flap or the like for fitting the batteries.

Such pocket lights generally have only a single lamp, the so-called primary lamp, which is designed to provide a great lighting power or lighting range and so forth in order to ensure that the pocket light enjoys a maximum range of use. That has the advantage that, even when only a low level of lighting power is required, such as for example when reading in the dark, that primary light source must operate with a level of lighting strength which is much too great and therefore the service life of the batteries or accumulators used is relatively short.

III. Representation of the Invention a) Technical object

Therefore the object of the present invention is to provide a pocket light or a housing portion for a pocket light, which has different lamps for different purposes of use and which in particular is very simple in terms of its technical structure.

b) Attainment of the Object

That object is attained by the features of claims 1, 2, 3 and 18. Advantageous embodiments are set forth in the appendant claims.

The fact that a light emitting diode, in particular a white light emitting diode, and/or a colored diode, an infra-red diode or an infra-red laser is used as the secondary lamp means that the service life of the battery, when using the light emitting diode instead of the primary lamp, can be drastically extended or the secondary lamp still shines for a long time when the voltage is already too low for the primary lamp and the latter is therefore no longer lit.

In order to afford an indication function the current consumption of a laser diode which is used in this respect as the secondary lamp is also markedly lower than the stratagem, which is otherwise known, of partially screening the primary lamp by a cover or ancillary attachment lens.

Arranging the secondary lamp in series in the circuit of the primary lamp affords a particularly simple circuitry and therewith also mechanical structure for the housing portion according to the invention and the whole of the pocket light.

The housing portion in which the one or more secondary lamps are disposed can either be a housing portion which, in the case of an existing pocket light, can be substituted for a housing portion which is already included therein as standard, for example the closure cap at the rear end of a tubular pocket light, or the battery compartment cover in the case of another pocket light.

The housing portion however may also involve an additional portion for a pocket light which is already in existence, for example a supplemental portion which, in the case of a tubular pocket light, is screwed in an intermediate position between the main body of the housing and the closure cap at the rear end, or the like.

Hereinafter in regard to the specific description of the invention reference will be made to an implementation in the form of a closure cap in the case of a tubular pocket light, which is substituted for the normal closure cap and which is fixed in relation to the main body by means of screwing into a female screwthread which is provided therein.

c) Embodiments by way of Example

Embodiments of this kind in accordance with the invention are described by way of example in greater detail hereinafter with reference to the Figures in which—in each case in longitudinal section through the corresponding housing portion and with the associated electrical circuit—

Figures 1A, 1B:
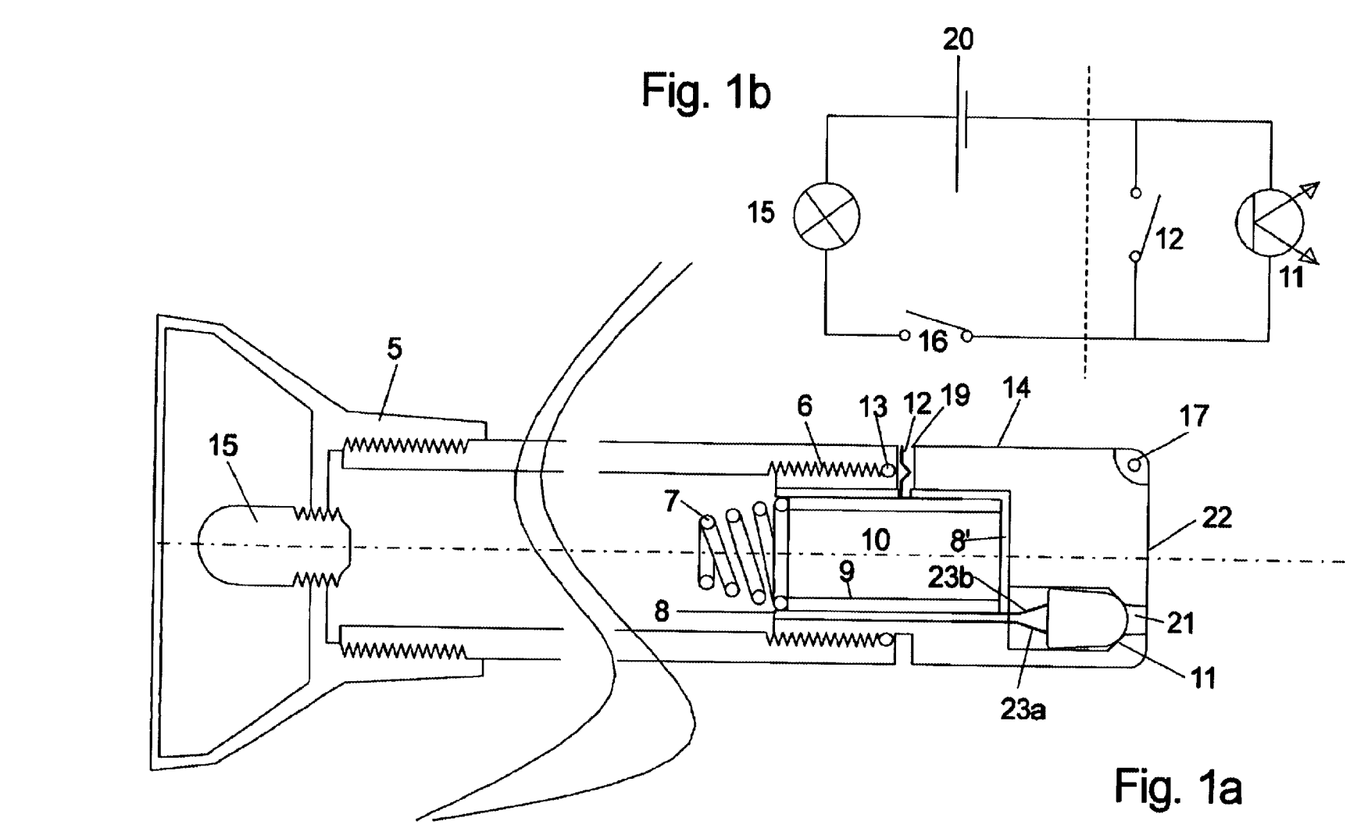
FIG. 1 shows a closure cap with a light emitting diode as the secondary lamp.
Figure 2A:
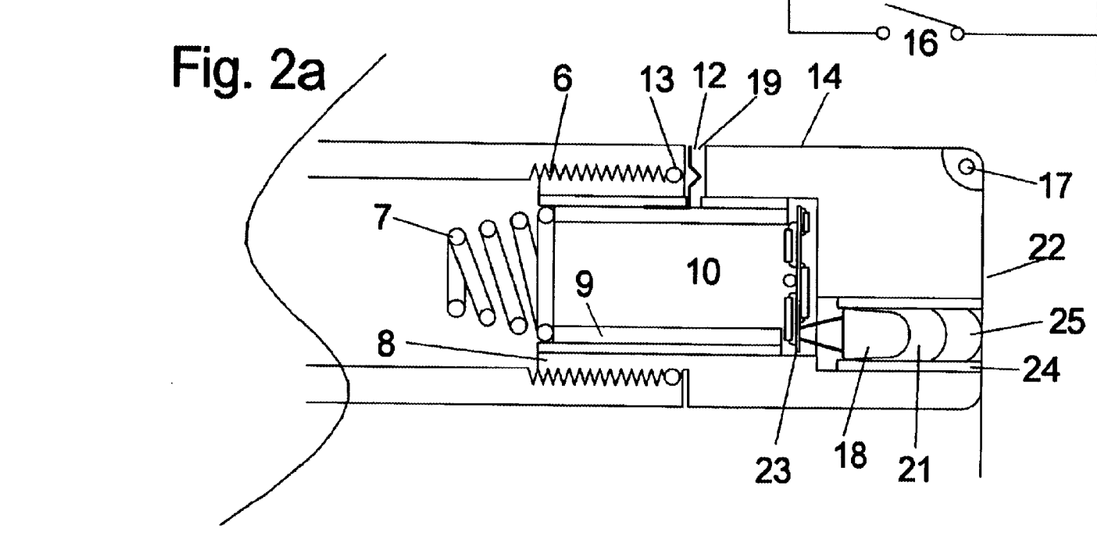
FIG. 2 shows a closure cap with a laser diode as the secondary lamp.
Figure 3A:
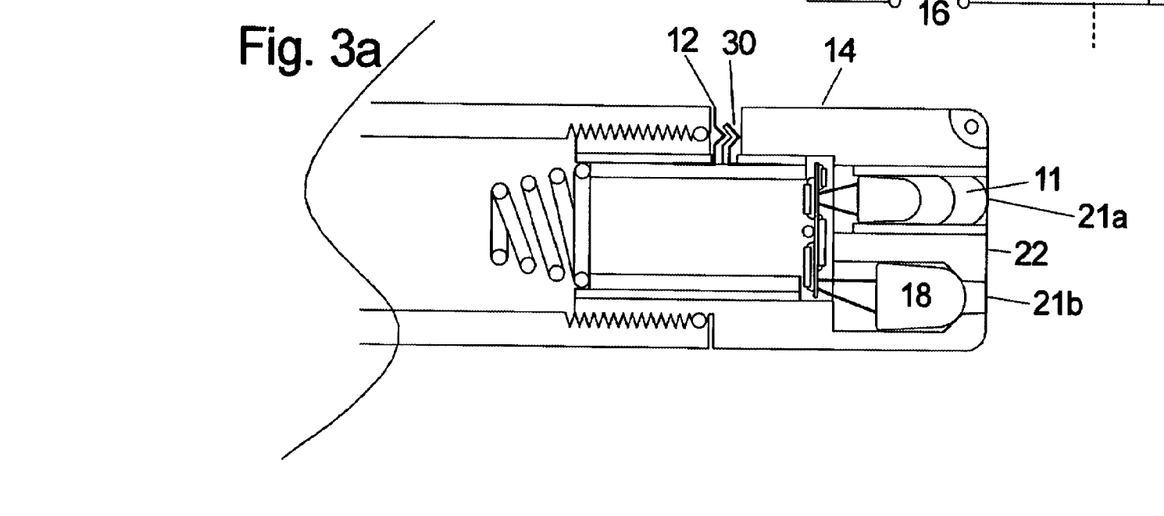
FIG. 3 shows a closure cap with a light emitting diode and a laser diode, that is to say two secondary lamps.

While FIG. 1a shows a view in longitudinal section of the complete pocket light or flashlight, FIGS. 2a and 3a only illustrate the housing portions designed in accordance with the invention, in the form of closure caps.

The description hereinafter sets forth the features shown in FIGS. 1a, 2a and 3a which are the same in all three embodiments. These features provide that the closure cap includes a one-piece cup-shaped main body 14 of metal, which is secured to the rear end of the tubular portion 5 of the tubular pocket light, with the open end of the interior 10 of the main body 14 facing towards the remainder of the pocket light. For that purpose, in the end region of the open end, the main body 14 has a male screwthread 6 which can be screwed into a female screwthread 6' at the end of the tubular portion 5 of the housing of the pocket light. A sealing ring 13 for affording sealing integrity is arranged between those two.

In this arrangement the main body 14 frequently has an eye 17 at the rearward closed end, for fixing thereto a cable loop or the like.

A connecting opening 21 is disposed between the interior 10 and the rear closed outer end face 22. The connecting opening 21 extends in particular in the longitudinal direction of the tubular pocket light and can be produced for example by drilling.

The connecting opening 21 which preferably involves a narrowing taper towards the end face 22 is dimensioned in accordance with the dimensions of the light emitting diode 11 which is to be disposed there and which is inserted in such a way that it bears with its front end against the taper and that the two contact lugs or terminals 23a, 23b thereof project into the interior 10.

The battery spring 7 which is usually provided on such a closure cap, being a coil spring of a conical configuration, in this case preferably does not bear directly against the bottom of the interior 10 of the main body 14, but the inside wall and the bottom of the interior 10 are lined with an insulating layer 8, for example a cup-shaped plastic portion, into which is inserted an electrically conductive inner metal tube which extends to close to the open end of the interior 10 and whose outwardly directed end face serves as a support for the battery spring 7 and is preferably non-losably connected thereto.

The one contact lug or terminal 23a of the light emitting diode 11 ends between the insulating layer 8 and the electrically conductive main body 14 of the closure cap and in this case is held in contact against the main body 14 in particular by the accurately fitting cup-shaped insulating layer 8.

The other contact lug or terminal 23b is passed through a bore in the bottom of the cup shape of the insulating layer 8 and terminates between the insulating layer 8 and the inner metal tube 9, wherein once again a continuous and intimate electrically conductive contact is ensured between the contact lug or terminal 23b and the inner metal tube 9 by virtue of the small clearance or indeed the press fit as between the inner metal tube 9 and the insulating layer 8 which is disposed in outward relationship with respect thereto.

In addition a transverse bore 19 extends both through the wall of the main body 14 in the axial region thereof in which the internal space 10 extends and also at the same location through the insulating layer 8. The transverse bore 19 extends substantially radially. Disposed in the transverse bore 19 is a spring tongue 12 which extends in the longitudinal direction of the bore and which is cranked at its inwardly disposed end and which, like the contact lug or terminal 23b, is held between the inner metal tube 9 and the insulating layer 8 which is in outwardly disposed relationship therewith in electrically conductive intimate contact with the inner metal tube 9. In the rest position in which no forces act thereon, as shown in FIG. 1a, the radially outwardly projecting part of the spring tongue 12 does not bear against the walls of the transverse bore 19 but against the metal main body 14, in spite of a V-shaped bend in the configuration of the spring tongue 12.

As however the transverse bore 19 is arranged in particular at the rearward end of the male screwthread 6 the main body 14 projects radially further outwardly on the side of the transverse bore 19 which is remote from the male screwthread 6, than on the other side which is formed by the male screwthread 6. When the closure cap is screwed on to the tube portion 5 of the light housing therefore the rear end of the tube portion still does not press against the spring tongue 12 and thus the spring tongue 12 still does not involve contact with the wall of the transverse bore and thus with the main body 14, which otherwise is prevented in particular by virtue of the fact that the transverse bore in the cup-shaped insulation is of a smaller cross-section than the transverse bore in the wall of the main body 14.

The spring tongue 12 therefore serves as a switch in the electrical circuit of the pocket light, as is shown in FIG. 1b:

The primary switch 16, that is to say the switch which is already originally present for switching the primary lamp 15 on and off, the battery 20 and the secondary lamp 11 are connected in series in the circuit of the primary lamp 15. The switch in the form of the spring tongue 12 or another switch can short-circuit the secondary lamp, the light-emitting diode 11.

If therefore, as shown in FIG. 1a, the spring tongue 12 does not involve any contact with respect to the main body 14 and in addition the pocket light overall is activated by closure of the primary switch 16, the current flows both by way of the light emitting diode 11 and also by way of the primary lamp 15, in which case the whole of the metal housing of the pocket light, that is to say the tube portion 5 as well as the main body 15 of the closure cap, serves as an electrical conductor. Nonetheless in that case only the light emitting diode 11 lights up as, due to the low current which flows by way of the diode, the primary lamp of the light is not caused to light and accordingly it also does not entail any substantial power consumption. On the contrary in that condition the lamp 15 which is not lit up is used as a series resistor for the diode although if necessary it is also possible for additional series resistors to be arranged in the closure cap, for example in the internal space 10 of the main body 14 of the closure cap.

If in contrast the closure cap is screwed into the tubular portion 5 to such an extent that the end thereof brings the spring tongue 12 into electrical contact against the metal main body 14, then as a result the switch 12 is closed as shown in FIG. 1b. The current of the battery 20 flows only by way of the primary switch 16 and the primary lamp 15, but not by way of the light emitting diode 11. The primary lamp 15 therefore lights up when the primary switch 16 is closed in that condition, but otherwise the pocket light does not light.

Figure 2B:
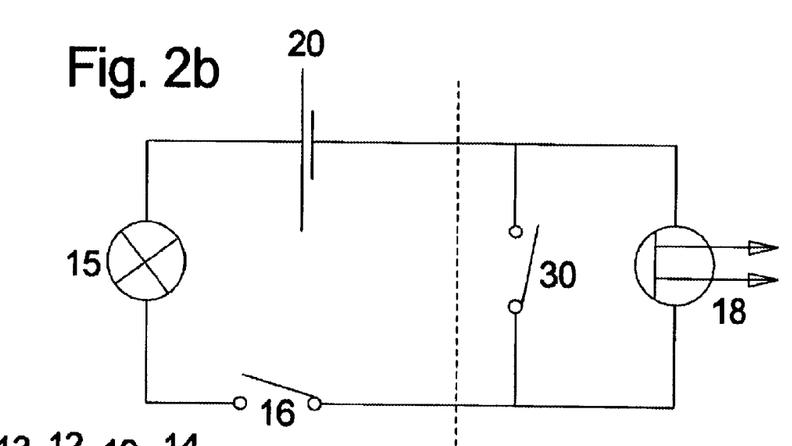

The structure shown in FIGS. 2a and 2b differs from that shown in FIG. 1a and 1b in that, instead of a light emitting diode 11, it uses a laser diode 18 which, for better focusing thereof, has an optical device 25 in the form of a lens in the connecting opening 21 at the front end thereof. The lens is preferably fixed by means of a tubular insert 24 as a press fit in the connecting opening 21.

The two contact lugs or terminals of the laser diode 18 are connected to an electronic operating device 23 which is disposed on a circuit board in the bottom region of the internal space 10 and the two terminals of which are connected on the one hand to the spring tongue 12 and on the other hand to the metal main body 14. For that purpose, the insulation of the internal space 10, instead of being removed through a cup-shaped insulating layer, can also be removed through a tubular insulating layer. Another possible option provides making the contact with respect to the main body 14 by again fixing the corresponding contact lug, either of the electronic operating device 23 or directly of the laser diode 18, between the tubular insert 24 which must comprise insulating material and the internal periphery of the connecting opening.

The electronic circuitry in FIG. 2b is identical to that of FIG. 1b except for the fact that a laser diode 18 is used instead of the light emitting diode. The electronic operating system is not shown separately in the circuit illustrated in FIG. 2b and is intended to be a component part of the laser diode 18 illustrated therein.

The structure shown in FIG. 3 has both a light emitting diode 11 and also a laser diode 18 in parallel connecting openings 21a, 21b which again both terminate at the rear end face 22. The electrical connections of the connecting lugs or terminals correspond to those in Figures 1a and 2a respectively. As however the light emitting diode 11 and the laser diode 18 can be switched independently separately from each other, for that purpose the arrangement requires two spring tongues 30 which in the rest condition are spaced relative to each other, in the transverse bore 19, of which one spring tongue 30 switches the light emitting diode 11 and the other switches the laser diode 18. By increasingly screwing the closure cap towards the tube portion 5 which is no longer shown in FIG. 3a, firstly one of the two spring tongues 12, 30 and then the other thereof is brought into contact with the main body 14 and in that way, depending on the respective electrical association involved, firstly the light emitting diode 11 and then in addition the laser diode 18 are switched off so that only one of the two secondary lamps alone can be switched. That will generally rather be the laser diode 18.

Figure 3B:
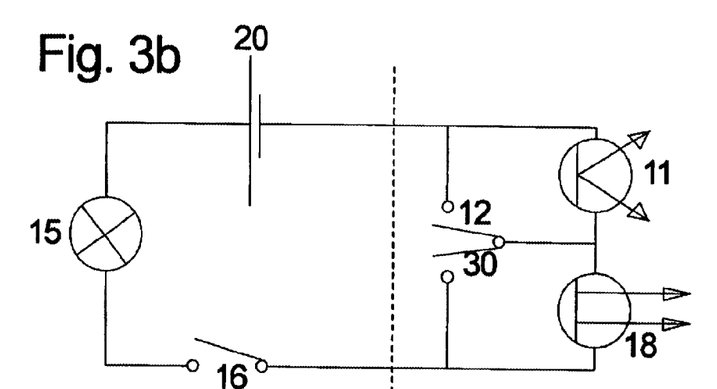

That affords the circuit shown in FIG. 3b wherein the light emitting diode 11 and the laser diode 18 are connected in series with the primary lamp 15, besides the primary switch 16 and the battery 20.

In this case the light emitting diode 11 can be bridged by the spring tongue 12 and the laser diode 18 by the spring tongue 30.

Figure 4A:
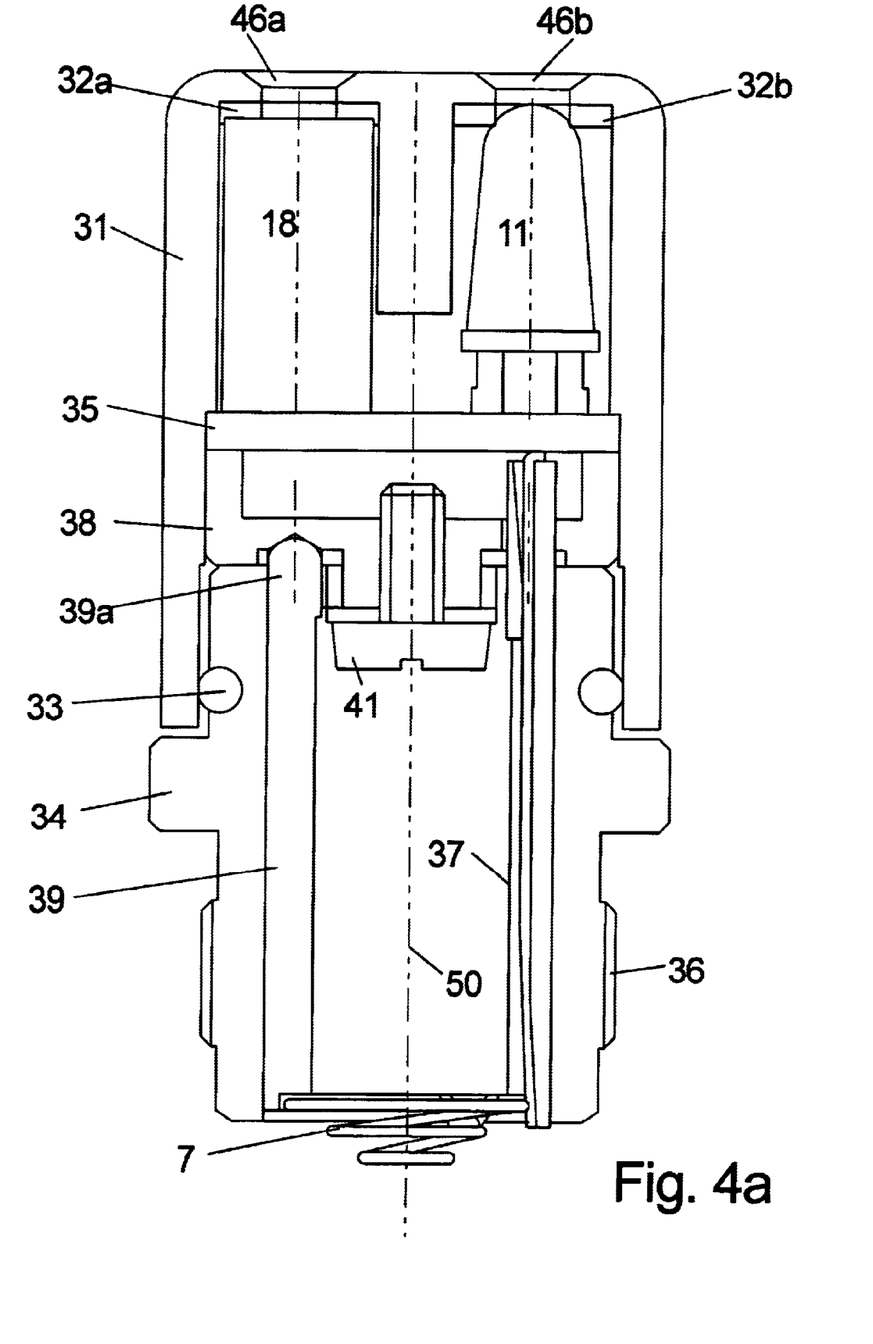
FIG. 4a shows a view in longitudinal section through another embodiment of the housing portion.

FIG. 4a separately shows the finished assembled housing portion. For the purposes of connecting it to a pocket light of rod-like or tubular configuration, it is screwed by means of a male screwthread 36 into the female screwthread of the tubular main portion of the housing of the pocket light.

That male screwthread 36 is disposed at the one end of the external periphery of a cup-shaped main body 34 whose other, substantially closed end carries the cap 31 which is again cup-shaped and which is a component part of a rotary unit and is rotatable with respect to the main body 34. That rotatable portion serves at the same time as a rotary switch which, as a secondary switch 43, as shown in the circuit diagram in FIG. 4d, controls the secondary lamps 42a, 42b, ... which are disposed in the cap 31. At such secondary lamps 42a, 42b the specific illustration in FIG. 4a shows a white light emitting diode 11 and a laser diode 18. Depending on the size of the tubular light and thus the cap 31 however it is also possible to provide three, four or more secondary lamps 42a, 42b, 42c, 42d ..., as indicated in the circuit diagram in FIG. 4d.

Figure 4B:
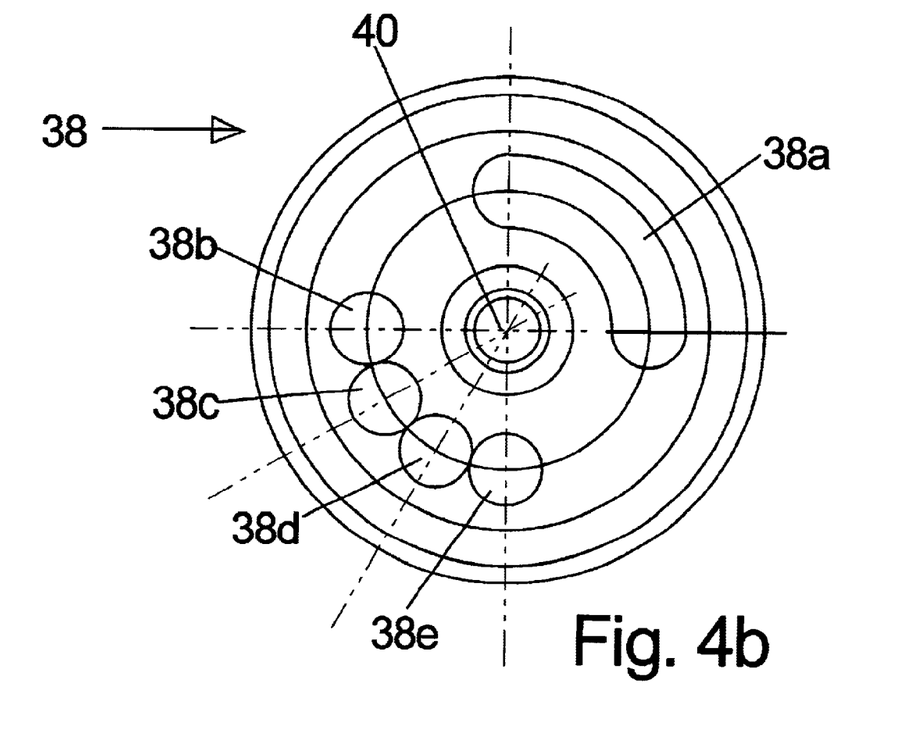
FIGS. 4b and 4c show detail views of the rotary plate.
Figure 4C:
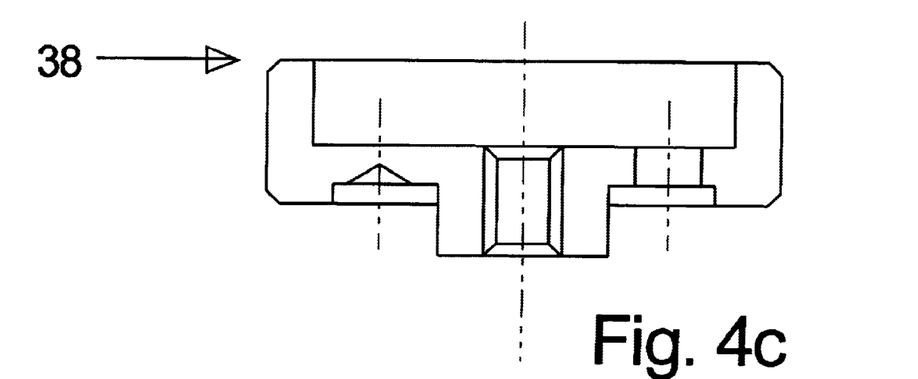
Figure 4D:
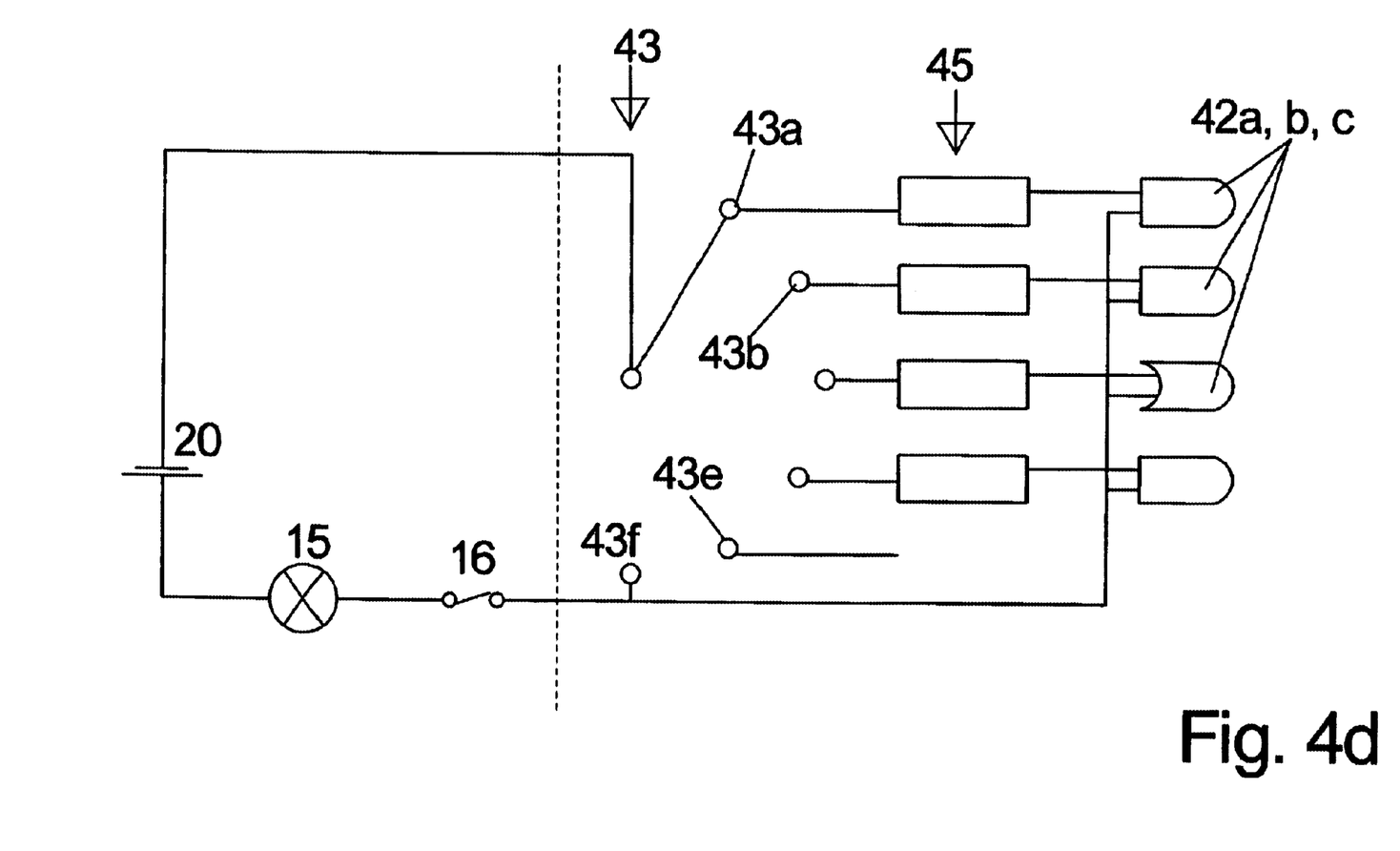
FIG. 4d shows the circuit diagram of the housing portion shown in FIGS. 4a through 4c.

It can also be seen from FIG. 4d that one of the switching contacts 43a, 43b, 43c, 43d, 43e is a blind switching contact which terminates blind, that is to say it is not connected to any secondary lamp, and thus serves to interrupt the entire circuit.

As the circuit diagram shows, this generally involves only a single circuit which involves a series connection made up of the one or more batteries 20 as the voltage source, the primary lamp 15 and its primary switch 16, as well as the secondary switch 43 which in this case is in the form of a rotary switch, and is selectively connected to a respective one of the switching contacts 43a, 43b, 43c, ....

When a connection is made to a secondary lamp for example 42a and upon suitable setting of the rotary switch to the switching contact 43a that secondary lamp 42a is lit only when in addition the primary switch 16 which actually serves for switching on the primary lamp 15 is also closed. As the secondary lamps 42a, 42b, 43c and accordingly therefore also the secondary lamp 42a which is switched in that situation has a substantially greater resistance than the primary lamp 15, the current flowing in the circuit is so small that the primary lamp 15 is not lit and therefore also does not consume any power worth mentioning.

In order also to be able to completely switch off the light solely with the secondary switch 43 so that neither one of the secondary lamps 42a, 42b, 42c, ... nor the primary lamp 15 is lit, the arrangement includes the blind secondary contact 43e. The secondary contact 43f serves to bridge the circuit, by-passing the secondary lamps 42a, 42b, 42c, so that then only the primary lamp 15 is contained in the circuit as the sole consumer and lights up when the primary switch 16 is closed.

In that respect, arranged between each switching contact for example as at 43a and the corresponding secondary lamp for example as at 42a is the secondary electronic device 45a which is associated with that secondary lamp.

In the specific design configuration of the housing portion as is shown in FIGS. 4a through 4c, the secondary electronic devices 45a, 45b, 45c are disposed on the circuit board 35 which is arranged transversely with respect to the longitudinal direction 50 at a spacing with respect to the exit openings 46a, 46b in the end of the cap. Disposed in the free space therebetween are the secondary lamps 42a, 42b, ..., in this case a light emitting diode 11 and a laser diode 18, in each case in alignment and in oriented relationship with the respective exit opening 46a, 46b and sealed off in relation thereto by means of annular seals 32a, 32b and being electrically conductively connected to the secondary electronic devices 45a, 45b on the circuit board 35.

The switching contacts 43a, 43b, ... of the secondary switch 43 are arranged on the rear of the circuit board 35, which faces away from the secondary lamps, that is to say the light emitting diode 11 and the laser diode 18. Disposed at a spacing with respect to the rear side and also non rotatably connected to the cap 31 and arranged in the latter is a rotary plate 38 which is also disposed transversely with respect to the longitudinal direction 50. The rotary plate 38 has a central opening 40 which serves for the passage therethrough of a screw 41 and for screwing to a corresponding central opening in the end wall of the also cup-shaped main body 34 which projects into the free end of the cap 31. Sealing integrity between the two is afforded by way of an interposed sealing ring 33 which nonetheless permits rotary movement about the longitudinal direction 50 with respect to the main body 34, of the rotary unit consisting of the cap 31, the circuit board 35 and the rotary plate 38. The main body 34 is in turn so firmly screwed by means of a screwthread 36 into the housing (not shown in FIG. 4a) of the rod-type pocket light that it is non-rotatably connected thereto and, in spite of the rotary movement of the rotary unit, in particular the cap 31, does not also rotate therewith.

Arranged in the interior of the also cup-shaped main body 34 is a sleeve 39 which fits snugly against the inside periphery of the main body and which comprises electrically non-conductive material, for example plastic material. The coil battery spring 37 which in the assembled condition presses against the batteries of the light is supported against the end face of the sleeve 39, which faces towards the free end of the main body 34.

At a location on its periphery the sleeve 39 has a contact pin 37 of electrically conductive material, which extends in the longitudinal direction 50 and which is connected with its one end to the battery spring 7 and which with its other end passes through a passage opening on the one hand through the end wall of the main body 34 and on the other hand through the rotary plate 38 which is positioned in front of same in the longitudinal direction.

In this case, the contact pin 37 passes through the rotary plate which is shown in detail in the plan view of FIG. 4b, through a slot 38 which is arranged arcuately and concentrically with respect to the central opening 40 thereof. Rotatability of the rotary unit, in particular the cap 31, with respect to the main body 34 is limited to the angular segment of the slot 38a.

The view on to the rotary plate 38 in FIG. 4b shows that rotary plate viewing FIG. 4 in a direction from below, that is to say as considered from the direction of the main body 34. The retaining or detent recesses 38b which in particular are in the form of conical countersunk bores are in this case also arranged along an arcuate line concentrically with respect to the central bore 40 at the underside thereof. They serve for latching engagement of a retaining or detent head 39a which is part of the sleeve 39 and which at a location of the periphery extends through a corresponding further passage opening in the end wall of the main body 34 and, depending on the respective rotational position of the cap 31, latches into one of the retaining recesses 38b and in that way holds in positively locking relationship the corresponding switching position of the rotary switch 43 which respectively also corresponds to contacting of one of the switching contacts 43a, 43b, . . . on the rear of the board 35, by the contact pin 37. By virtue of the inherent elasticity of the rotary plate 38 which is generally made from plastic material, further rotary movement is possible, in spite of the axial biasing force which applies a loading to the retaining head 39a, caused by the battery spring 7. The magnitude of the biasing effect is further determined by the amount to which the screw 41 is tightened in the assembly operation.

In the structure shown in FIG. 4a, the return flow of the current from the circuit board 35 occurs in particular by way of the rotary plate 38 which comprises electrically conductive material to the main body 34 which also comprises electrically conductive material and from there by way of the screwthread 36 into the rod-shaped housing of the light, the housing also comprising electrically conductive material.

Figure 5A:
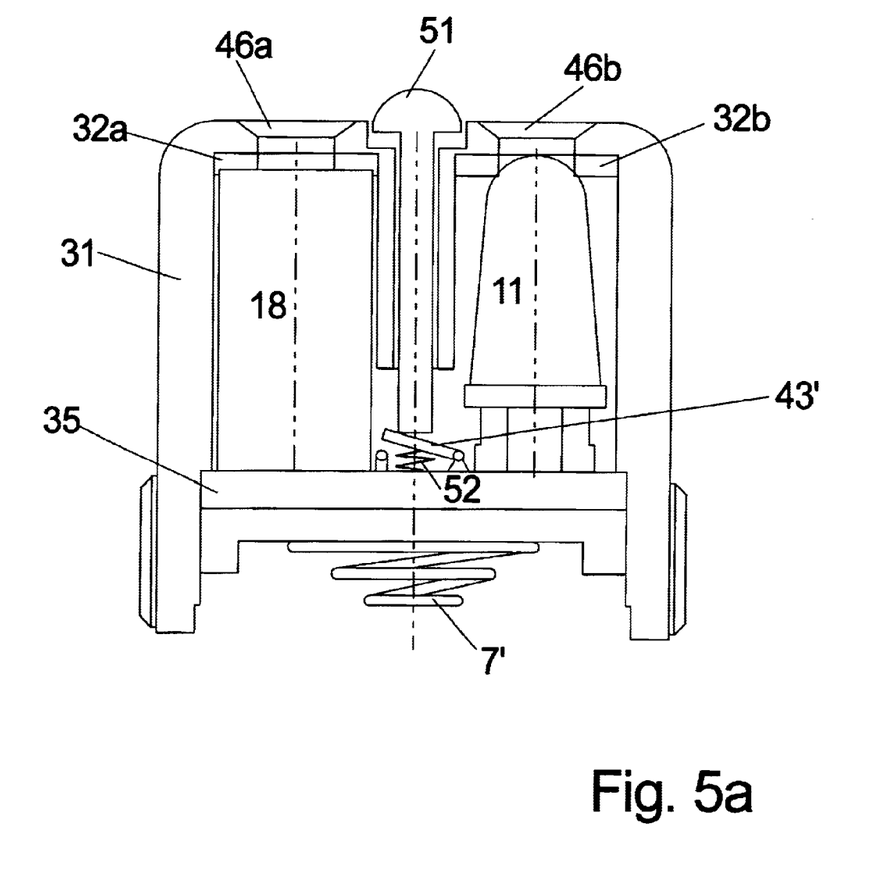
FIG. 5 shows a further embodiment of the invention.
Figure 5B:
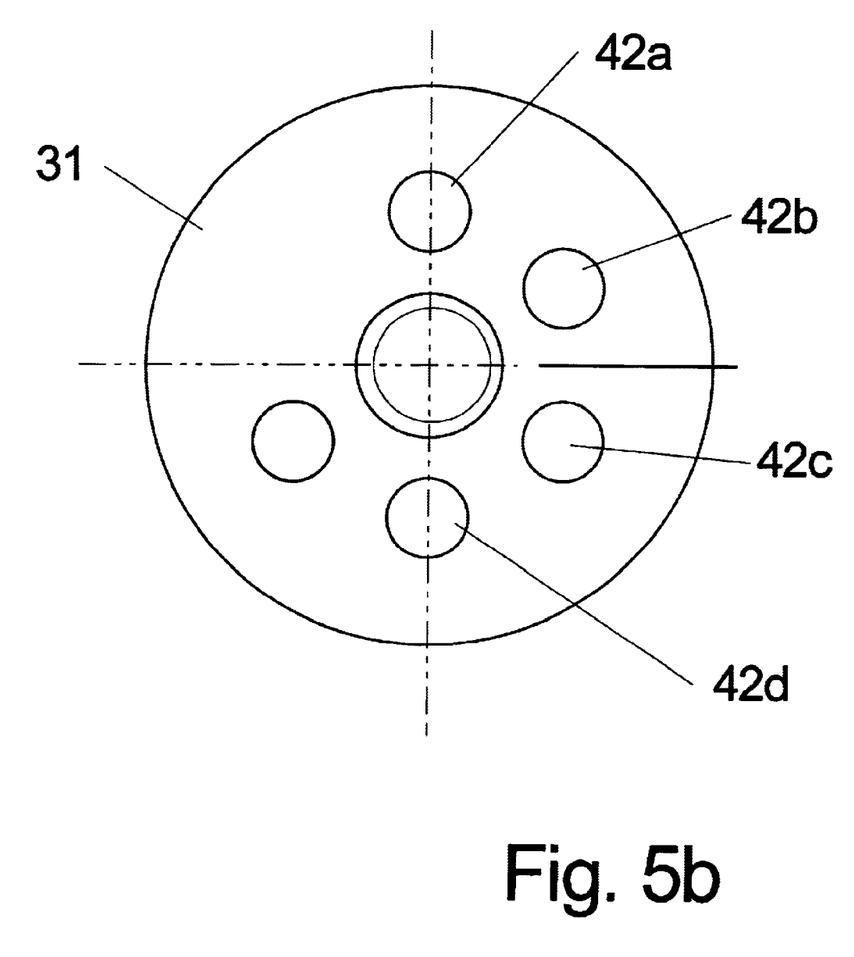
Figure 5C:
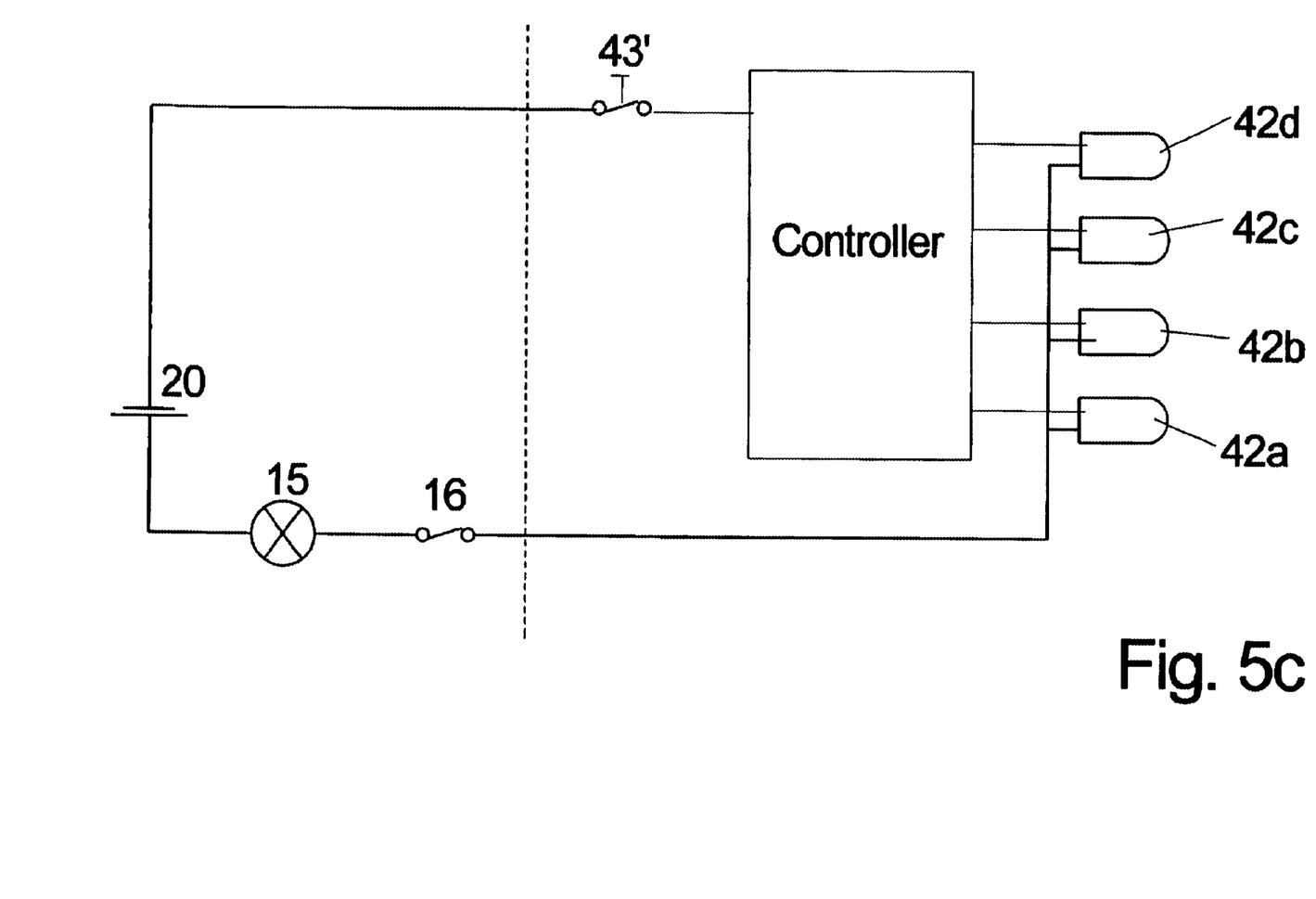

FIGS. 5 show a further design configuration in accordance with the invention. In this case FIG. 5c shows a circuit diagram whereby the circuit of the primary light 15 and the associated primary switch 16 also includes in series the secondary switch 43' for the secondary lamps 42a, 42b, . . . . They are respectively connected in parallel with the primary circuit by way of a controller so that, by means of only one single secondary switch 43', multiple successive keying thereof provides that the desired secondary lamp 42a, 42b, 43c or 42d is caused to light up or the light is set in such a way that no secondary lamp is lit.

FIG. 5a is a view in longitudinal section showing the basic structure of such a cap 31 which, like the view shown in FIG. 4a, has a male screwthread 36 for screwing into the housing of the pocket light as well as exit openings 46a, 46b which are arranged in the end face of the cap 31 on a circular arc and behind which are arranged the corresponding secondary lamps, for example a light emitting diode 11 or a laser diode 18, which are conductively connected to a circuit board 35 arranged transversely in the cap.

Unlike the structure shown in FIG. 4a, in FIG. 5a the circuit board 35 is mechanically supported on the rear side which is in opposite relationship to the secondary lamps, by a spring 7', with respect to the batteries of the light (not shown), by way of a stable intermediate transmitting portion.

In this case switching of the desired secondary lamp is effected by way of a central button 51 which projects out of the end face of the cap 31 at the center thereof and which with its inwardly projecting free end actuates the secondary switch 43' on the circuit board 35, which is biased by way of a spring 52 into the opened condition and which forms the resistance for the button 51.

This structure has the advantage that few mechanical components, more specifically only the secondary switch 43' and its button 51, are required, and in addition the secondary lamps can also be used when the battery voltage of the light is already too low to cause the primary lamp 15 to light up.

FIG. 5b shows a view on to the end face of the cap with the centrally arranged button 51 and the secondary lamps 42a, 42b arranged therearound on a line in the form of a circular arc.

List of References 5 tubular portion
6, 6' male/female screwthread
7 battery spring
8 insulating layer
9 inner metal tube
10 internal space
11 light emitting diode
12 spring tongue
13 sealing ring
14 main body
15 primary lamp
16 primary switch
17 eye
18 laser diode
19 transverse bore
20 battery
21 connecting opening
22 end face
23a, 23b contact lugs
24 tubular insert
25 lens
30 spring tongue
31 cap
32a, 32b seal
33 sealing ring
34 main body
35 circuit board
36 screwthread
37 contact pin
38 rotary plate
38a slot
39 sleeve
39a retaining head
40 central opening
41 screw
42a, 42b, 43c secondary lamps
43 secondary switch
44 secondary contacts
45 secondary electronic devices
46a, 46b exit openings
50 longitudinal direction
51 button
52 spring

What is claimed is:

1. A housing portion for a housing of a pocket light, wherein said housing includes closing a primary lamp and a primary switch and wherein said housing portion comprises:

at least one secondary lamp and a secondary switch for switching the secondary lamp between an open and closed condition;

a circuit mechanism connecting at least one secondary lamp and the primary lamp in series, the arrangement being such that the secondary switch is operable in the closed condition thereof to short-circuit the secondary lamp, wherein at least one secondary lamp is a lamp with a maximum of a tenth of the power demand of the primary lamp; and at least one secondary lamp is a light emitting diode.

2. A housing portion as set forth in claim 1 including;
   means for supplying all lamps with power from a common direct circuit source namely a battery.

3. A housing portion as set forth in claim 1 wherein the housing is a tubular housing having first and second ends and the primary lamp is arranged at the first end of the tubular housing and the housing portion represents an intermediate portion between the tubular housing and a closure cap at the second end of the tubular housing.

4. A housing portion as set forth in claim 1 wherein the housing portion has a light emitting diode and a laser diode as secondary lamps and the secondary switch is so arranged that said secondary switch is operable to selectively short-circuit at least one of the light emitting diode and the laser diode.

5. A housing portion as set forth in claim 1 wherein the housing portion is a cap of a tubular housing;
   wherein the housing portion comprises a main body which can be fixedly connected by screwing to the tubular housing and a rotary unit in which the at least one secondary lamp is arranged; and
   wherein the rotary unit serves as a secondary switch for switching the secondary lamp.

6. A housing portion as set forth in claim 5 wherein the rotary unit includes a cap formed on the end part of the housing portion and a the tubular housing.

7. A housing portion as set forth in claim 5 wherein the rotary unit includes a cap which is carried on the free end of the main body and in particular overlaps the free end of the main body and in the closed end at least one opening for the emergence of the at least one secondary lamp disposed in the cap.

8. A housing portion as set forth in claim 7 wherein the rotary unit includes a rotary plate and a circuit board, wherein the circuit board carries at least one secondary electronic device for the secondary lamp and in particular the rotary plate is arranged axially closer to the free end of the cap transversely with respect to the longitudinal extent of the cap with respect to the circuit board and has a central opening by way of which the rotary plate can be screwed axially fixedly but rotatably to the main body as at the end wall thereof by means of a screw.

9. A housing portion as set forth in claim 8 wherein said central opening and a slot which is arranged arcuately and concentrically with respect to the central opening and through which a contact pin extending in the axial direction and coming from the main body passes through the rotary plate and contacts the face of the circuit board which is towards the rotary plate and which carries there corresponding, electrically conductive separate switching contacts.

10. A housing portion as set forth in claim 1 including; an electronic operating device connected upstream of the diode.

11. A housing portion as set forth in claim 10 wherein the electronic switching device is arranged at the bottom of an opening in a cup-shaped housing portion.

12. A housing portion as set forth in claim 11 wherein the secondary lamp is arranged in the bottom of a cup-shaped housing portion in a through opening which connects the outside of the bottom to the internal free space of the cup-shaped housing portion.

13. A housing portion as set forth in claim 1 including;
   a single button arranged in the tail face of a cap wherein both the secondary switch and also the choice among a plurality of available secondary lamps is effected by said button.

14. A housing portion as set forth in claim 1 wherein the at least one secondary lamp is a lamp with a maximum of a fiftieth of the power demand of the primary lamp.

15. A housing portion as set forth in claim 1 wherein the housing portion is in the form of a closure cap and has a spring element as the secondary switch which is arranged at a spacing relative to a contact surface of the housing portion with respect to the rest of the housing and when the housing portion is pressed against the remaining housing comes into electrically conductive contact with the housing portion, and wherein the secondary lamp is connected to the spring element and to the main body of the housing portion.

16. A housing portion as set forth in claim 1 wherein the housing portion has a spring element as the secondary switch and the main body of the housing portion is in the form of a closure cap of a cup-shaped configuration with an electrically conductive insert wherein said electrically conductive insert is accommodated therein and which has a contact element for contacting of a battery and wherein said electrically conductive insert is insulated with respect to the main body of the housing in the condition of not being fixedly connected to the housing, and is connected to the spring element.

17. A housing portion as set forth in claim 1 wherein the housing portion is the end cap of the tubular housing of a tubular light;
   wherein the housing portion comprises a main body which can be fixedly connected as by screwing to the tubular housing and a rotary unit in which the at least one secondary lamp is arranged; and
   wherein the rotary unit serves as a secondary switch for switching the secondary lamp.

18. A housing portion as set forth in claim 17 wherein the rotary unit includes a cap is formed on the end part of the housing portion and of the tubular housing.

19. A housing portion as set forth in claim 1 wherein a main body is of a sleeve-shaped configuration and at an open end includes a male screwthread for screwing into a corresponding female screwthread at the end of the tubular housing.

20. A housing portion as set forth in claim 19 wherein said sleeve-shaped configuration is a cup-shaped configuration.

21. A housing portion as set forth in claim 1 wherein a rotary unit includes a cap which is carried on the free end of the main body and in particular overlaps the free end of the main body and in the closed end at least one opening for the emergence of the at least one secondary lamp disposed in the cap.

22. A housing portion as set forth in claim 21 wherein the rotary unit having a rotary plate and a circuit board, wherein the circuit board carries the at least one secondary electronic device for the secondary lamp and in particular the rotary plate is arranged axially closer to the free end of the cap transversely with respect to the longitudinal extent of the cap with respect to the circuit board and has a central opening by way of which the rotary plate can be screwed axially fixedly but rotatably to the main body as at the end wall thereof by means of a screw.

23. A housing portion as set forth in claim 22 wherein the central opening has a slot which is arranged arcuately and concentrically with respect to the central opening and through which a contact pin extending in the axial direction and coming from the main body passes through the rotary plate and contacts the face of the circuit board which is towards the rotary plate and which carries there corresponding, electrically conductive separate switching contacts.

24. A housing portion as set forth in claim 1 including;
   an electronic operating device connected upstream of the diode.

25. A housing portion as set forth in claim 24 wherein the electronic switching device is arranged at the bottom of the opening in the cup-shaped housing portion.

26. A housing portion as set forth in claim 25 wherein the secondary lamp is arranged in the bottom of the cup-shaped housing portion in a through opening which connects the outside of the bottom to the internal free space of the cup-shaped housing portion.

27. A housing portion as set forth in claim 1 including;

a single button arranged in the tail face of a cap wherein both the secondary switch and also a choice among a plurality of available secondary lamps is effected by said button.

\* \* \* \* \*